United States Patent [19]

Thompson et al.

[11] 3,841,902

[45] Oct. 15, 1974

[54] DURABLE FIRE RETARDANT FABRICS MADE USING ORGANIC SOLVENT SYSTEMS OF BROMINATED PHOSPHATE MONOMERS

[75] Inventors: James M. Thompson, Salisbury, N.C.; Carmine P. Iovine, Somerset; Dilip K. Ray-Chaudhuri, Somerville, both of N.J.

[73] Assignee: National Starch and Chemical Corporation, Plainfield, N.J.

[22] Filed: Sept. 15, 1972

[21] Appl. No.: 289,341

[52] U.S. Cl.................. 117/136, 8/115.5, 8/115.6, 8/DIG. 15, 117/137, 117/139.5 CE, 117/143 A, 117/145, 117/161 R, 117/139.4, 260/963
[51] Int. Cl................................. B44d 1/50
[58] Field of Search........... 117/136, 139.5 CF, 137, 117/145, 118, 143 A; 8/115.5, 115.6; 260/963

[56] References Cited
UNITED STATES PATENTS

| | | | |
|---|---|---|---|
| 3,307,214 | 3/1967 | Belvedere | 117/136 |
| 3,321,330 | 5/1967 | Mohney | 117/145 |
| 3,471,318 | 10/1969 | Redfarn | 117/137 |
| 3,501,339 | 3/1970 | Gurgiolo | 117/118 |
| 3,507,668 | 4/1970 | Carl et al. | 117/136 |
| 3,598,733 | 8/1971 | Hindersinn | 117/137 |
| 3,641,202 | 2/1972 | Biranowski | 117/136 |
| 3,708,328 | 11/1973 | Kelkheim et al. | 117/136 |

*Primary Examiner*—William D. Martin
*Assistant Examiner*—William R. Trenor
*Attorney, Agent, or Firm*—Kemon, Palmer & Estabrook

[57] ABSTRACT

Durable fire retardant properties are imparted to fabrics by application to the fabric of organic solvent systems containing polymerizable unsaturated brominated phosphate monomer, e.g., bis-(2,3-dibromopropyl) acryloxyethyl phosphate, and copolymerizable olefinically unsaturated monomer, e.g., diallyl phthalate, evaporation of volatile solvent and in situ polymerization of monomers retained in the fabric. Preferably, the solvent systems additionally contain multifunctional aminoplast precursors, e.g., N,N-dimethylol allyl carbamate, as synergist binders, and the treated fabric also attains durable press properties.

10 Claims, No Drawings

DURABLE FIRE RETARDANT FABRICS MADE USING ORGANIC SOLVENT SYSTEMS OF BROMINATED PHOSPHATE MONOMERS

BACKGROUND OF THE INVENTION

1. Field of the Invention

This invention relates to textile products that have durable fire retardancy, to methods of producing such textile products and to anhydrous solvent systems containing polymerizable unsaturated brominated phosphate monomer for use in such methods.

2. Description of the Prior Art

Extensive use has been made of phosphorus and halogen containing compounds to impart fire retardant properties to textiles and other substrates. In characterizing the fire retardancy of such monomers, a convenient notation known as "Fire Retardant Index" may be utilized. The index of any particular material is calculated on a weight basis utilizing the following equation.

$$FRI = 10\,(P\%) + 2(Br\%) + (Cl\%) + 2(N\%)$$

For example, a compound containing 5 percent, by weight, phosphorus and 50 percent, by weight, bromine would exhibit an FRI of 150. It has been determined that for general industrial applications, an FRI of at least about 60 is required to impart satisfactory fire retardance. FRI values of at least about 80 are usually required for use with cellulosic substrates.

One type of compound widely used to impart fire retardancy is tris-haloalkyl phosphates. They have been used in molded plastics (see U.S. Pat. Nos. 3,306,937; 3,361,847 and 3,615,743), combined with an organic resin binder and coated on textiles (see U.S. Pat. No. 3,471,318), mixed with phenolic resins to impregnate cellulosic sheets in forming structural laminated panels (see U.S. Pat. No. 3,549,479) and used as an ingredient in aerosol sprays used to fire-proof textiles or other substrates (see U.S. Pat. No. 3,607,745). Bis-haloalkyl phosphates have also been used, e.g., the ammonium salt of bis-(2,3-dibromopropyl) phosphate (see U.S. Pat. No. 3,660,582) and the amides of brominated dialkylene phosphates (see U.S. Pat. No. 2,574,518). A further discussion of the use of the haloalkyl phosphates for fire-proofing can be found in Little, "Flameproofing Textile Fabrics," Reinhold Publishing Corp., New York (1947).

Difficulties have been encountered in use of haloakyl phosphates as disclosed in the prior art. One difficulty relates to their limited hydrolytic stability. This may be encountered in the utilization of the phosphates on substrates with the result that fire retardant groups are either readily leached from the substrate or converted on the substrate to non-fire retardant alkaline earth phosphate salts during wet launderings.

In order to overcome the problems of the phosphates, phosphonates have been used instead (see U.S. Pat. Nos. 2,803,562 and 3,325,563). Polymerizable phosphonates have been used to impregnate fabrics and form in situ fire-retardant polymers, e.g., wool treated with bis-chloroethyl vinyl phosphonate (see U.S. Pat. No. 3,669,610).

While the phosphonates exhibit greater hydrolytic stability, polymerizable monomer phosphonates are more difficult to polymerize at high monomer concentrations into solid polymers and at high concentrations required for fire retardancy, it is difficult to utilize these phosphonates in the treatment of substrates for fire retardance. Hence, there is a need for a way to be able to use fire-proofing polymerizable phosphate monomers while avoiding the hydrolytic instability problem so that treated products can be obtained that will retain good fire-retardancy even after repeated wet launderings.

OBJECTS

A principle object of the present invention is the provision of new methods for durably increasing the fire retardancy of textile products.

Further objects include the provision of:

1. New compositions for treatment of fabrics to improve their fire retardant properties.

2. New textile products having fire retardance that is durable even to repeated wet laundering of the products.

3. New methods for rendering fabrics both durably fire retardant and durably crease resistant, i.e., for producing durable press fabrics having durable fire retardancy.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description. It should also be understood the foregoing abstract of the disclosure is for the purpose of providing a non-legal brief statement to serve as a searching-scanning tool for scientists, engineers and researchers and is not intended to limit the scope of the invention as disclosed herein nor is it intended it should be used in interpreting or in any way limiting the scope or fair meaning of the appended claims.

SUMMARY OF THE INVENTION

These objects are accomplished by application to a textile product of an anhydrous organic solvent solution containing (a) polymerizable unsaturated brominated phosphate monomer as hereinafter defined and (b) copolymerizable olefinically unsaturated monomer as hereinafter defined, evaporation of volatile solvent from the solution containing textile product and in situ polymerization of monomers retained in the textile product, advantageously promoted by the presence of (c) a free-radical type catalyst.

Preferably, the solution applied to the textile product will contain as synergist binder to improve the durability of the fire retardancy imparted to the textile fabric (d) an aminoplast precursor as hereinafter defined. Advantageously, (e) an aminoplast curing catalyst is used to cure and set ingredient (d) upon the treated textile product.

Anhydrous solutions useful in the invention will contain in a volatile organic solvent 10–50 percent of ingredient (a) and 1–10 percent of ingredient (b). If used, ingredient (c) will be present in 0.1–5 percent, ingredient (d) in 1–30 percent and ingredient (e) in 0.1–3 percent. Advantageously, ingredient (d) will consist of a mixture of two ingredients (d1) and (d2) each of which will be present in 1–15 percent.

Application of the anhydrous solution, e.g., by immersion, to the textile product is conducted to provide in the fabric such quantity of solution that the weight ratio of ingredient (a) to the dry weight of the fabric will be between about 1:10 and 5:10.

Evaporation of solvent from the impregnated fabric is advantageously conducted at 20°–120°C. until substantially all volatile solvent is removed, e.g., about 5–30 minutes. Curing and setting of ingredients (a) and (b), plus ingredient (d) if present, is advantageously preformed at about 80°–200°C. for about 1–60 minutes.

A preferred method of producing textile products of the invention can be described as follows:

A. providing a substantially anhydrous solution in a volatile organic solvent of the following ingredients in the weight percentages indicated:

| (a) | bis-(2,3-dibromopropyl) acryloxyethyl phosphate | 10–50% |
| --- | --- | --- |
| (b) | diallyl phthalate | 1–10% |
| (c) | polymethoxy methyl melamine | 1–15% |
| (d) | dimethylol allyl carbamate | 1–15% |
| (e) | organic peroxide catalyst | 0.1–5% |
| (f) | aryl sulfonyl chloride catalyst | 0.1–3% |

B. applying said anhydrous solution to a fabric in such quantity that the weight ratio of said ingredient (a) applied to the dry weight of the fabric is between 1:10 and 5:10, C. evaporating substantially all volatile organic solvent from the fabric resulting from step B, and D. heating the solvent-freed fabric to a temperature of 80° to 200°C. for between about 1 to 60 minutes to cure and set ingredients (a), (b), (c) and (d) upon the fabric.

DESCRIPTION OF PREFERRED EMBODIMENTS

The following details of operations in accordance with the invention and reported data illustrate the further principles and practice of the invention to those skilled in the art. In these examples and throughout the remaining specification and the annexed claims, all parts and percentages are by weight unless otherwise specified.

EXAMPLE I

A clear homogeneous solution was prepared by mixing together in the parts specified, the following ingredients and stirring them until a stable solution was obtained:

| Bis-(2,3-Dibromopropyl) Acryloxyethyl Phosphate | 200 parts |
| --- | --- |
| Diallyl Phthalate | 50 parts |
| Methoxy Methyl Melamine | 30 parts |
| Lauroyl Peroxide | 10 parts |
| 1,1,1 Trichloroethane | 710 parts |

A quantity of lightweight 100 percent napped cotton fabric (for sleepwear) was immersed in the above solution until it was thoroughly impregnated. It was then pad-squeezed to a wet pick-up of 115 percent after which it was dried at room temperature (20°–25°C.) for 10 minutes resulting in substantially complete evaporation of the trichloroethane. The fabric at this point was subject to hot air cure cycle at 165°C. for one minute. After being removed from the hot air oven, the fabric was given a standard alkaline textile afterwash. At this point, samples were taken warp wise and filling wise and tested for flammability in accordance with DOC-FF-371 (Flammability for children sleepwear U.S. Dept. of Commerce). The test results produced char lengths of 3 inches with no afterglow or after flame. After 10 launderings (AATCC No. 124), a sample was retested per above showing char lengths of 3.5 inches with no after glow or after flame. Durable press rating (AATC No. 124) was 3.5.

EXAMPLE II

As in Example No. I, a clear solution was made of the following ingredients:

| Bis-(2,3-Dibromopropyl) Acryloxyethyl Phosphate | 350 parts |
| --- | --- |
| Diallyl Phthalate | 70 parts |
| Methoxy Methyl Melamine | 50 parts |
| Lauroyl Peroxide | 20 parts |
| Perchloroethylene | 510 parts |

A quantity of 35 percent polyester/65 percent cotton fabric (napped sleepwear) was immersed in the resulting solution until it was thoroughly impregnated and it was then pad-squeezed to a wet pick-up of 110 percent. The fabric was dried in a forced air oven at 100°C., then given a hot air cure at 150°C. for 2 minutes. The fabric was given a typical textile after wash (alkaline) and tumbled dry. Fabric was tested in accordance with DOC-FF-371 (U.S.D.C. — Flammability Act) and showed char lengths of 2 inches with no after burn or glow. After 10 launderings (AATCC No. 124) the wash/wear rating was 4.2 and F.R. char lengths were 2.5 inches with no after burn or glow.

EXAMPLE III

A clear solution was made of the following ingredients:

| Bis-(2,3-Dibromopropyl) Acryloxyethyl Phosphate | 350 parts |
| --- | --- |
| Methyl Methacrylate | 100 parts |
| Methoxyl Methyl Melamine | 20 parts |
| Benzoyl Peroxide | 15 parts |
| Trichloroethylene | 515 parts |

A quantity of light weight 50/50 polyester/cotton B/C was immersed in the resulting solution until thoroughly wetout and pad-squeezed to a wet pick-up of 100 percent. The fabric was dried at room temperature for 15 minutes resulting in substantially complete evaporation of the trichloroethylene. The fabric at this point was subjected to a hot air cure cycle of 150°C. for 1.5 minutes. After being removed from the hot air oven, the fabric was given an alkaline textile afterwash. At this point, samples were taken warp and filling wise and tested for flammability in accordance with DOC-FF-371 (U.S.D.C. Flammability Act). The test results showed char lengths of 3.5 inches with no after glow or after flame. After 10 home launderings (AATCC No. 124), the sample was retested per above showing char lengths of 3.5 inches with no after glow or after flame. The durable press (Wash-Wear AATCC No. 124) rating after 10 home launderings was 3.5.

EXAMPLE IV

A clear solution was prepared of the following ingredients:

| | |
|---|---|
| Bis-(2,3-Dibromopropyl) Acryloxyethyl Phosphate | 250 parts |
| N-Dimethylol Allyl Carbamate | 75 parts |
| Methanol | 25 parts |
| Methyl Methacrylate | 10 parts |
| Benzoyl Peroxide | 20 parts |
| P-Toluene Sulfonyl Chloride | 10 parts |
| 1,1,1 Trichloroethane | 610 parts |

A quantity of 100 percent cotton napped fabric (for sleepwear was immersed in the above solution until it was thoroughly impregnated. It was then pad-squeezed to a wet pick-up of 115 percent after which it was allowed to air dry to substantially complete evaporation of the trichloroethane. The fabric was next steamed to obtain a moisture regain of from 8–15 percent in the cellulosic material. After being removed from the oven, the fabric was given a typical alkaline afterwash. At this point, samples were taken warp and filling wise and tested for flammability according to DOC-FF-371 (U.S.D.C.). Test results on these swatches and similar swatches taken after 10 home launderings (AATCC No. 124) showed char lengths of 3 inches with no after glow or after flame. Wash-wear ratings were 3.8 (AATCC No. 124).

DISCUSSION OF DETAILS

An essential component of the treating solutions of the invention is polymerizable unsaturated brominated phosphate monomer, herein also referred to as ingredient (a). Those useable in the invention may be represented by the following formula:

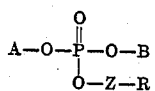

wherein A and B (which may be the same or different) are bromohydrocarbon radicals containing two to 12 carbon atoms and at least two bromine atoms,

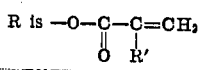

Z is alkylene containing two to six carbon atoms or haloalkylene containing two to six carbon atoms and one to six bromine or chlorine atoms, and R' is —H, —CH₃ or Cl.

Advantageously, A and B are bromoalkyl radicals containing two to six carbon atoms and the number of bromine atoms is at least equal to one-half the number of carbon atoms.

The designated radicals in the foregoing formula preferably may be as follows:
A and B may be
2,3-dibromopropyl
1,2,3-tribromopropyl
2,3,4-tribromobutyl
hexabromohexyl
2,4,6-tribromophenyl
pentabromophenyl
tribromoneopentyl
bis-(dibromophenyl)methyl
Z may be
ethylene
propylene-1,3
2-chloropropylene-1,3
dibromoneopentylene-1,3
2-bromopropylene-1,3
hexabromohexylene-1,6
R may be
acryloxy
α-methacryloxy
α-chloroacryloxy
Specific examples of a preferred class of monomers useable in the invention include:
the
acryloxyethyl,
acryloxypropyl,
methacryloxyethyl,
methacryloxypropyl,
3-acryloxy-2-chloropropyl,
3-methacryloxy-2-chloropropyl,
3-chloroacryloxy-2-bromopropyl, and
chloroacryloxypropyl esters of
bis-(2,3-dibromopropyl) phosphoric acid.
Other classes of monomers are the above listed esters of:
bis-(2,4,6-tribromophenyl) phosphoric acid
bis-hexabromohexyl phosphoric acid
bis-pentabromo-phenyl phosphoric acid
bis-(2,3,4-tribromobutyl) phosphoric acid
bis-(1,2-dibromoethyl) phosphoric acid
bis-(1,2,3-tribromopropyl) phosphoric acid
2,3-dibromopropyl-2,4,6-tribromophenyl phosphoric acid
penta bromophenyl tribromophenyl phosphoric acid
bis-perbromopropyl phosphoric acid A second essential component of the treating solutions of the invention is an olefinically unsaturated monomer copolymerizable with ingredient (a). This ingredient (b) advantageously is selected from the group consisting of vinyl esters, allyl esters, vinyl arenes, acrylic esters, methacrylic esters and chloroacrylic esters, said esters being free of phosphorus atoms.

In the group vinyl esters, specific examples include vinyl acetate, vinyl chloride, vinylidene chloride, vinyl propionate, divinyl succinate, vinyl ethyl maleate, vinyl hexahydrobenzoate, vinyl benzoate, vinyl α-bromoacetate, vinyl α-chloroacetate, vinyl α-dibromoacetate, vinyl α-dichloracetate, vinyl stearate, vinyl methoxyacetate and like esters.

In the group of allyl esters, diallyl phthalate is preferred. Other specific examples include allyl carbamate, triallyl trimellitate, diallyl maleate, diallyl fumarate, diallyl 1,4-cyclohexane dicarboxylate, diallyl tetrachlorophthalate, diallyl 3-bromophthalate, diallyl-4-chlorophthalate, diallyl succinate, diallyl 2,3-dibromosuccinate, diallyl 2-chlorosuccinate, diallyl adipate, diallyl perchloroadipate, diallyl oxalate, triallyl aconitate, triallyl cyanurate, diallyl maleate, diallyl diglycolate, diallyl itaconate, diallyl hexachlorobicyclo-(2.2.1)-5-heptene-2,3-dicarboxylate, and like methallyl esters.

In the group of vinyl arenes, specific examples include styrene, methyl styrene, 2,5-dichlorostyrene, 2,5-dibromostyrene, p-chlorostyrene, p-bromostyrene, p-divinyl benzene, 2,5-dimethyl styrene, p-isopropyl styrene, perchlorohexyl styrene, 2-methyl-5-ethyl styrene, α-bromostyrene, α-chlorostyrene and the like.

In the group of acrylic esters, specific examples include methyl acrylate, ethyl acrylate, butyl acrylate, octyl acrylate, ethylene glycol diacrylate, propylene glycol diacrylate, 1,2-dibromoethyl acrylate, allyl acrylate, 2-N-morpholinoethyl acrylate, pentachlorophenoxyacrylate, 2-ethylhexyl acrylate and the like.

In the group of methacrylic esters, specific examples include methyl methacrylate, vinyl methacrylate, ethyl methacrylate, butyl methacrylate, hexyl methacrylate, allyl methacrylate, methallyl methacrylate, 2-aminoethyl methacrylate, 2-bromoethyl methacrylate, pentachlorophenoxy methacrylate, perbromobutyl methacrylate, 2-ethyl hexyl methacrylate and the like.

In the group of chloroacrylic esters, specific examples include methyl chloroacrylate, ethyl chloroacrylate, butyl choroacrylate, 2-chloroethyl chloroacrylate, p-chlorophenoxy chloroacrylate, 2-ethyl hexyl chlorocrylate, cyclohexyl chloroacrylate and the like.

As the free-radical catalyst (ingredient c) organic peroxides are preferred, e.g., benzoyl peroxide, lauroyl peroxide, methyl ethyl ketone peroxide, acetyl peroxide, cumene hydroperoxide and the like. Also useable are azo catalysts, e.g., 2,2'-azobis-2,4-dimethyl valeronitrile; $\alpha,\alpha''$-azo diisobutyronitrile; 1,1'-azodicyclohexane carbonitrile and the like.

The anhydrous organic solvent used in forming the fabric treating solution of the invention may be any organic liquid having a boiling point between about 30°–200°C. and particularly 50°–120°C. including alkanes, alkenes, alkanols, arenes, esters, ketones and corresponding halo compounds. Haloalkanes are preferred because of non-flammability, e.g., 1,1,1-trichloroethane, perchloroethylene, ethylene chloride, ethylene bromide, 1,1,2-trichloro-1,2,2-trifluoroethane, 1,1,2-trichloroethane, carbon tetrachloride, but other useable solvents include dichloroethyl ether, cyclohexane, diacetone alcohol, acetone, amyl acetate, benzene, benzine, butyl acetate, butyl ether, 2-ethyl hexanol, heptane, isopropyl ether, isopropyl acetate, 3-methoxybutyl acetate, methyl cyclopentane, methyl ethyl ketone, methyl acetate, chloro benzene, morpholine, octane, tetrohydrofurfuryl alcohol, toluene and the like. Mixtures of two or more miscible solvents may be used, especially where rate of control of solvent evaporation may be desired.

The synergist binder (ingredient d) is used to improve durability of fire retardancy of the treated fabric. It may also impart durable press properties. Any known type of nitrogen containing textile crease-proofing agent that is soluble in chlorinated hydrocarbon solvents to at least 1 part per 100 parts of solvent is contemplated for use as ingredient (d). Aminoplast precursors are preferred and of these methylol amido compounds are particularly useful. Specific examples of polyfunctional aminoplast precursors include N,N-dimethylol allyl carbamate; methoxyl methyl melamine; polymethylol ethyl carbamate; polymethylol methoxyethyl carbamate; N,N'-dimethylol ethylene bis (ethyl carbamate); N,N'-dimethylol butane-1,3,-diol dicarbamate; N,N'-dimethylol diethylene glycol dicarbamate; N,N'-dimethylol-pentane-1,5-diol dicarbamate; methylated urea-formaldehyde prepolymer; and the like. Methyl, butyl and like lower alkyl ethers of methylol aminoplast precursors, which are themselves not soluble in halogenated hydrocarbon solvents, may also be used, e.g., the lower alkyl ethers of N,N'-dimethylol ethylene urea; trimethylol melamine; polymethylol pentaerythritol tetracarbamate; N,N',N''-trimethylol glycerol tricarbamate; polymethylol sorbitol hexakis (methyl carbamate); dimethylol dihydroxy ethylene urea; dimethylol-N-ethyl triazone; dimethylol uron; methylene-bis (N-methylol acrylamide); trimethylol acetylene diureine; tetramethylol acetylene diureine and the like. Examples of still other materials useable as ingredient (d) include formaldehyde-acrolein condensation products, methyl ether of methylol formamide, butyl ether of N-methylol acrylamide, methyl ether of N-methylol methacrylamide, N-methylol-N-methyl chloroacetamide butyl ether and the like. Advantageously, mixtures of two or more compounds are used as ingredient (d).

Regarding the ingredient (e), a wide selection of aminoplast catalysts soluble in anhydrous organic solvents are available for use in the new treatments. Advantageously, one selects such a catalyst that will not stain or discolor the fabric, cause excessive tendering or present safety or pollution problems. Aromatic sulfonyl halides have been found to be particularly useful, e.g., p-toluene sulfonyl chloride, benzene sulfonyl chloride, 2-chloro-4-ethylphenyl sulfonyl chloride, 2-butyl-4-methoxy-phenyl sulfonyl chloride, benzene sulfonyl bromide and the like. The catalyst that is used should be soluble at least to the extent of 1 percent in the organic solvent hereinbefore described. Advantageously, compounds used as the catalyst are acidic or react with water to form an acidic product. Additional preferred classes of compounds to use as catalysts include halogenated aromatic lactones, e.g., chlorophthalide, bromophthalide, iodophthalide, etc. and N-halo succimides, e.g., N-chlorosuccimide, N.-bromo-$\alpha,\beta$-dibromosuccinimide, N-chloro teraconimide, N-chlorophthalimide and the like. The amount of catalyst used will depend, in part, upon the particular ingredient (d) used, the temperature for curing and similar factors. Generally, the fabric treating solution will comprise 0.1 to 3 percent of the catalyst.

Auxiliary reagents of various types may be included in the treating solutions, advantageously in amounts between 0.1 to 20 percent and particularly between 0.5–15 percent, especially 1–10 percent. Such auxiliary reagents include dyes; mildew-proofing agents; sanitizing agents; softening agents; plasticizers; hand-builders and the like.

The fire retardant treatments of the invention are useable with all varieties of textile materials. They are particularly useful with cellulosic textile material, i.e., any woven, knit or non-woven fabric as well as garments, bed-clothes, furniture coverings or any other textile material made in whole or in part of cellulosic fibers. Cellulosic fibers include cotton, linen, viscose rayon, high modulus rayon (polynosic). These may be blended in yarns with synthetic fibers, e.g., nylon, polyester, polyolefin and other fibers or filaments or the textile materials may comprise mixed weaves or knits of cellulosic yarns or filaments and synthetic yarns or filaments. The new treatments may also be used advantageously with 100 percent polyester fabrics or blends of polyester fibers and other synthetics, e.g., polyester/nylon blends.

The anhydrous treating solutions of the invention may be applied in a variety of ways. Dipping and padding, well known in the art, can be used. Additional methods include spraying, roller coating, float coating and the like. However, if enclosed equipment is not used, loss of solvent to the atmosphere can be costly and/or present ecological problems. Equipment is commercially available to preform the application of organic solvent treating solutions without loss of solvent to textile material, e.g., see "Textile Industries," Oct. 1966, ps. 288–9, 291, 295, 299, 339 and 397.

Following the application of the anhydrous treating solution, the volatile components of the solution are removed, e.g., by evaporation. Passage of the textile material through drying ovens, through infra-red ovens or in any other suitable manner may be used. The evaporated organic solvent is removed and recovered with available solvent handling systems. As a less desirable alternative, the impregnated textile material may be permitted simply to air dry at ambient conditions.

The removal of the organic solvent from the textile material leaves a moisture and solvent depleted fabric. At this point in the new operations, if the treating solution contained ingredient (e), the solvent depleted fabric should be exposed to water vapor to create therein a moisture regain in the cellulosic portion of the fabric of between about 8 and 15 percent. For 100 percent cotton, this will mean a total moisture regain of 8–15 percent while a 50 percent cotton/50 percent polyester fabric would involve a total moisture regain of 4–7.5 percent. Advantageously, this is accomplished by steaming of the textile material. Exposure to high humidity at room temperature or other moisture regain techniques can, however, be used.

The textile material is finally subjected to a heat curing step to polymerize and set the ingredients (a) and (b), plus ingredient (d) if used, upon the fabric. This heat curing may proceed immediately after solution application and solvent evaporation, plus moisture regain if applied. Alternatively, a delay cure procedure may be used. In any event, heat curing equivalent to 1–60 minutes at about 80°–200°C., preferably 1–15 minutes at 120°–170°C., is used to sufficiently produce an increased fire retardant rating in the textile material as compared to untreated textile material.

The embodiments of the invention in which an exclusive property or right is claimed are defined as follows:

1. A method of producing a textile product having durable fire retardancy and durable press properties which comprises:
   A. providing a substantially anhydrous solution in a volatile organic solvent of the following ingredients in the weight percentages indicated of the total solution:

| | | |
|---|---|---|
| (a) | bis-(2,3-dibromopropyl) acryloxyethyl phosphate | 10–50% |
| (b) | diallyl phthalate | 1–10% |
| (c) | polymethoxy methyl melamine | 1–15% |
| (d) | dimethylol allyl carbamate | 1–15% |
| (e) | organic peroxide catalyst | 0.1–5% |
| (f) | aryl sulfonyl chloride catalyst | 0.1–3% |

B. applying said anhydrous solution to a fabric in such quantity that the weight ratio of said ingredient (a) applied to the dry weight of the fabric is between 1:10 and 5:10,
   C. evaporating substantially all volatile organic solvent from the fabric resulting from step B, and
   D. heating the solvent-freed fabric to a temperature of 80° to 200°C. for between about 1 to 60 minutes to cure and set ingredients (a), (b), (c) and (d) upon the fabric.

2. The method of claim 1 wherein step C is conducted at 20° to 120°C. for between about 5 to 30 minutes.

3. The method of claim 1 wherein step B is preformed by immersion of the fabric in said anhydrous solution.

4. The method of claim 1 wherein said fabric of step B is selected from the group consisting of cellulosic fabrics and polyester fabrics.

5. A method of durably increasing the fire retardancy of a textile product which comprises:
   A. providing a substantially anhydrous solution in a volatile organic solvent 10–50 percent of ingredient (a), 1–10 percent of ingredient (b) and 0.1–5 percent of ingredient (c), said percentage being by weight of the stated ingredients based on the total weight of the solution,
   B. applying said anhydrous solution to a fabric in such quantity that the weight ratio of said ingredient (a) applied to the dry weight of the fabric is between about 1:10 and 5:10,
   C. evaporating substantially all volatile organic solvent from the fabric resulting from step B, and
   D. heating the solvent-freed fabric to a temperature of about 80°–200°C. for about 1–60 minutes to cure and set ingredients (a) and (b) upon the fabric,
   said ingredient (a) being a polymerizable unsaturated brominated phosphate monomer of the formula:

$$A-O-\underset{\underset{O-Z-R}{|}}{\overset{\overset{O}{\|}}{P}}-O-B$$

wherein A and B are bromohydrocarbon radicals containing 2 to 12 carbon atoms and at least two bromine atoms, $$R \text{ is } -O-\underset{\underset{R'}{|}}{\overset{\overset{}{\|}}{\underset{O}{C}}}-C=CH_2$$

Z is alkylene containing 2 to 6 carbon atoms or haloalkylene containing 2 to 6 carbon atoms and 1 to 6 bromine or chlorine atoms,
   R' is —H, —CH₃ or —Cl, and
   A and B may be the same or different,
   said ingredient (b) being an olefinically unsaturated monomer copolymerizable with ingredient (a) selected from the group consisting of vinyl esters, allyl esters, vinyl aryl hydrocarbons, acrylic esters, methacrylic esters, chloroacrylic esters, and
   said ingredient (c) is a free-radical type catalyst.

6. The method of claim 5 wherein ingredient (b) is a diallyl ester of dicarboxylic acid and ingredient (c) is an organic peroxide.

7. The method of claim 5 wherein ingredient (a) is bis-(2,3-dibromopropyl) acryloxyethyl phosphate.

8. The method of claim 7 wherein ingredient (b) is diallyl phthalate and ingredient (c) is lauroyl peroxide.

9. The method of claim 8 wherein said solution additionally contains 1–15 percent of a nitrogen containing crease-proofing agent.

10. A textile product having durable fire retardancy properties produced by the process of claim 5.

* * * * *